Patented Jan. 7, 1941

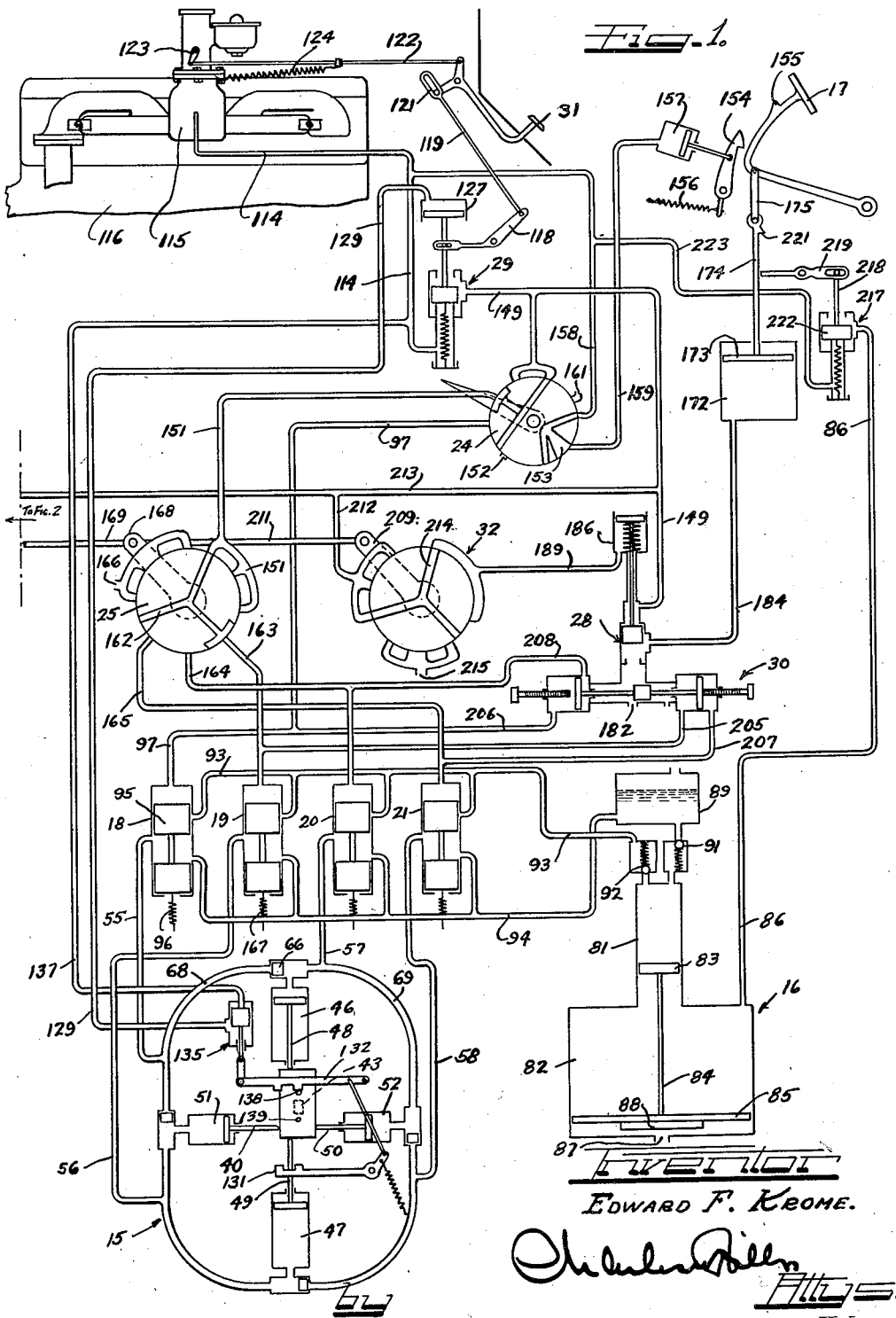

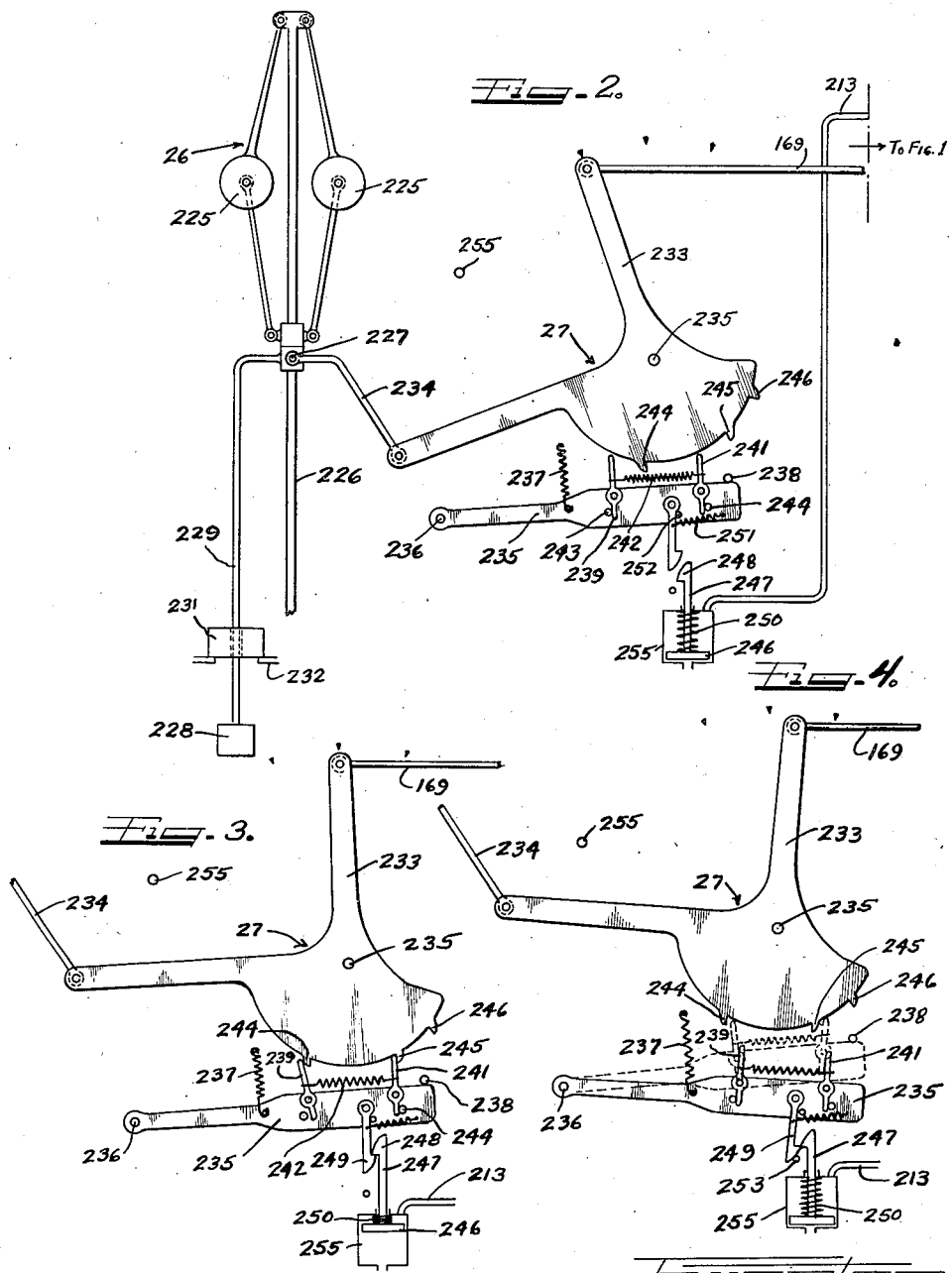

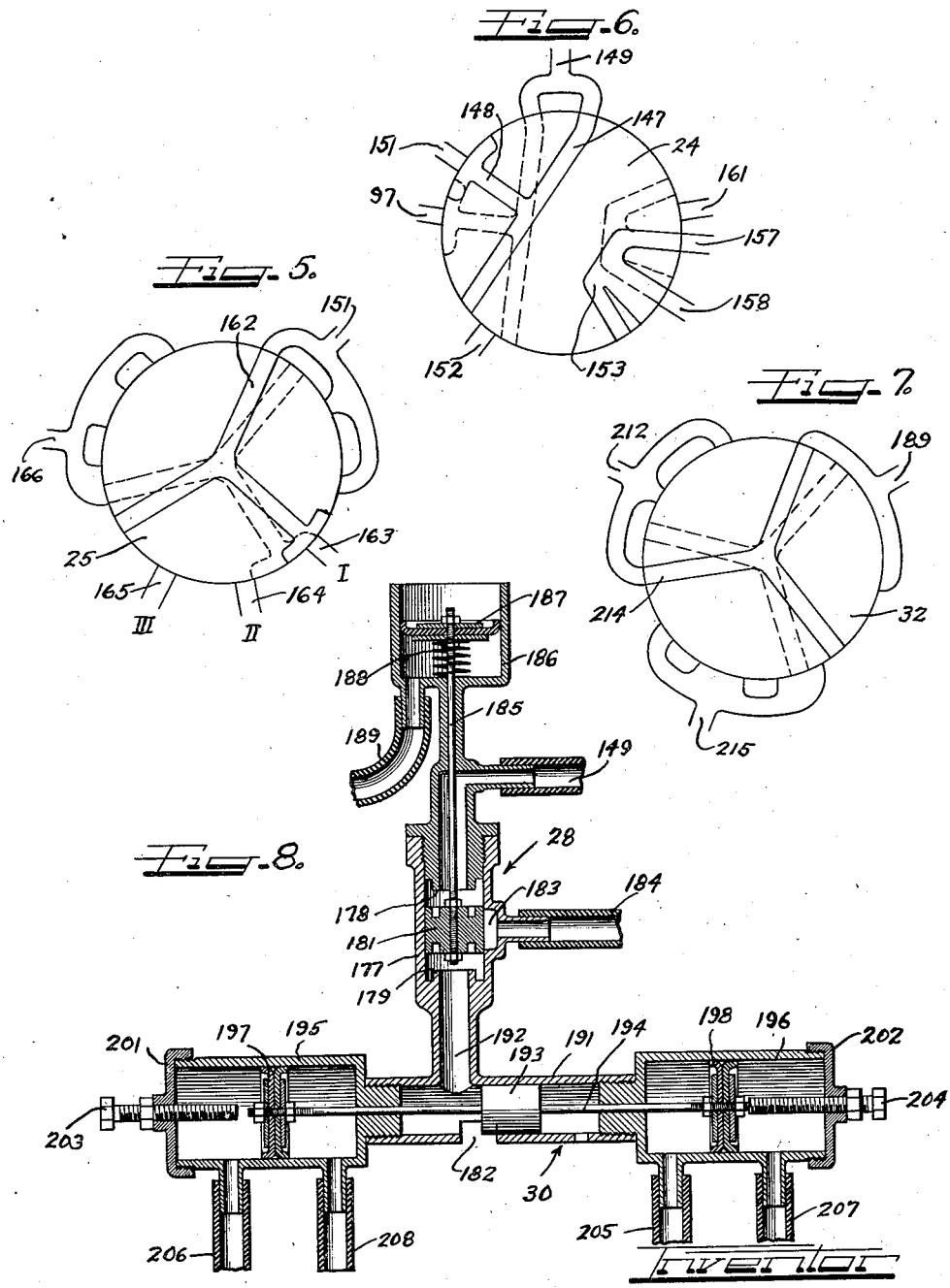

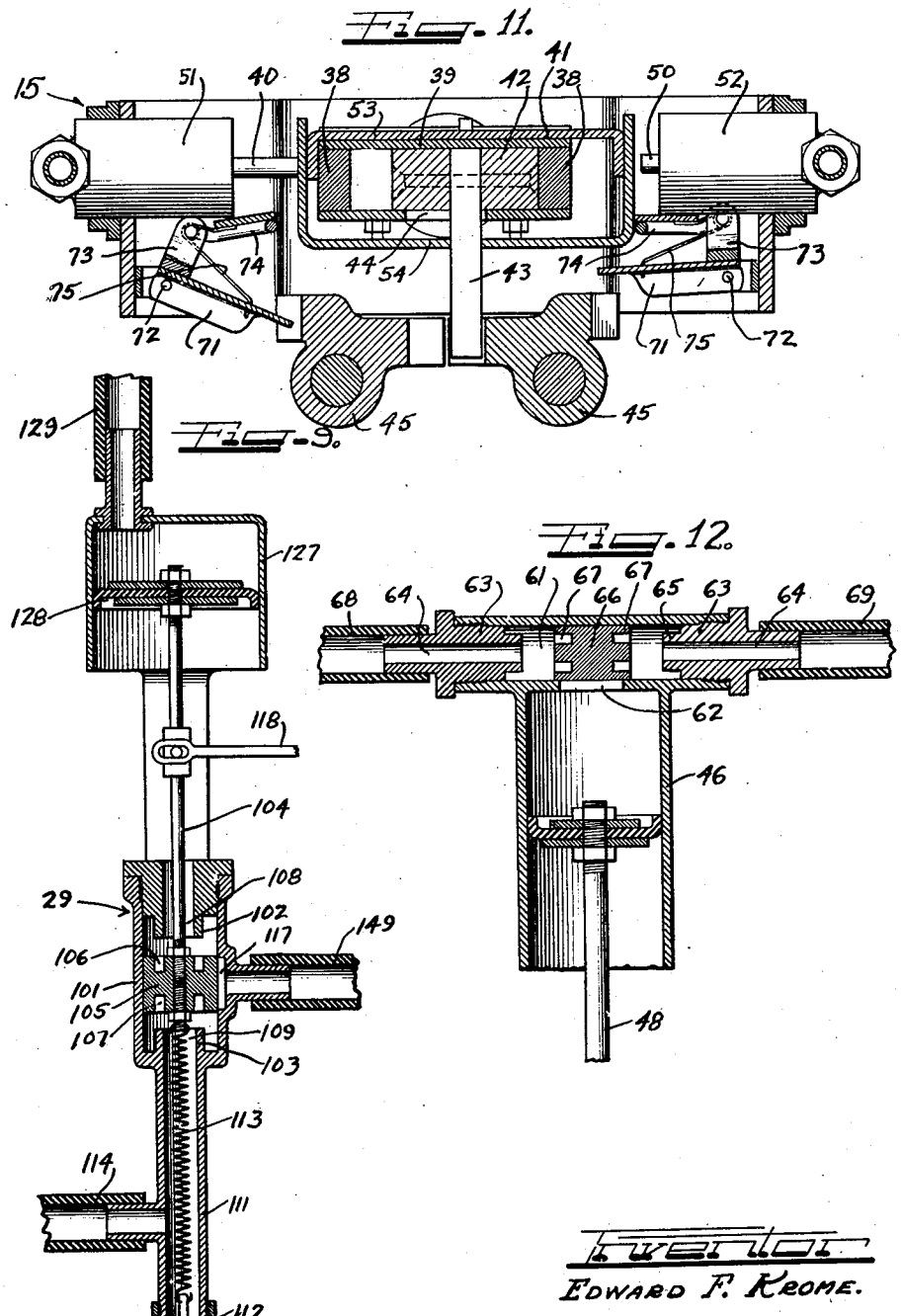

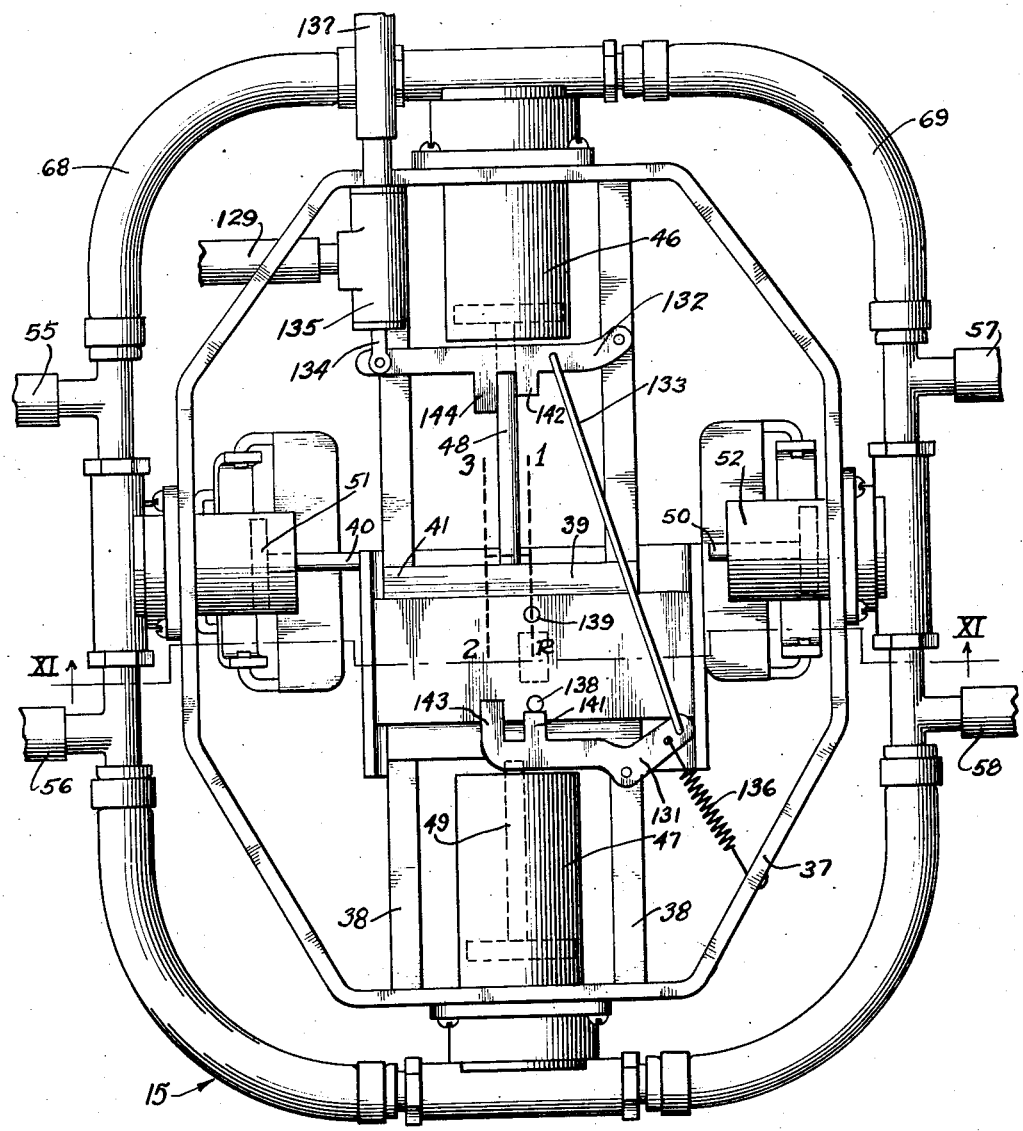

2,228,082

UNITED STATES PATENT OFFICE 2,228,082

AUTOMATIC TRANSMISSION

Edward F. Krome, Chicago, Ill.

Application October 3, 1938, Serial No. 233,127

16 Claims. (Cl. 192—3.5)

This invention relates to automatic transmissions and more particularly to automatic transmissions including a conventional clutch and gear box, or other forms of disengageable torque transmitting mechanism and speed changing elements having definite stepped ratios.

One of the principal objects of this invention is to provide an automatic control mechanism which is adapted to be combined with a conventional clutch and gear box, and to form therewith an automatic transmission.

Another object of this invention is to provide an automatic transmission control mechanism for combination with a conventional clutch and gear box which will automatically cause a disengagement of the clutch and a change in the ratio provided by the gear box followed by a re-engagement of the clutch whenever the conditions under which the vehicle is being operated make a change in ratio desirable and when, at the same time, the operator of the vehicle releases the accelerator and momentarily allows the torque being transmitted by the engine to drop to zero.

Another object of this invention is to provide an automatic transmission control mechanism which operates upon the release of the accelerator of the motor vehicle by the operator, and which will completely execute a disengagement of the clutch, a gear shift and a re-engagement of the clutch in the proper order no matter how momentary may be the release of the pressure upon the accelerator.

Another object of this invention is to provide an automatic transmission control mechanism in which the shifting from one speed to the next takes place only upon the release of the accelerator pedal and in which the determination of whether a shift to a higher speed is to be made or not is controlled by the speed of the vehicle.

Another object of this invention is to provide an automatic transmission control mechanism of the general character described above and in which means are provided to prevent the making of a shift from low speed to high speed without passing through intermediate speeds in cases where the operator of the vehicle has accelerated in low speed to a vehicle speed at which a shift into high would normally occur.

Another object of this invention is to provide an automatic transmission control mechanism for use with a motor vehicle having a clutch and a gear box and in which means are provided for automatically disengaging and re-engaging the clutch, the speed of re-engagement being automatically determined by the selection of a gear ratio in the gear box.

Another object of this invention is to provide a power gear shifting device operated by suction from an engine manifold, the suction being used to place a liquid under pressure and the liquid under pressure being employed in small cylinders mounted upon the gear box in order to perform the actual shifting.

Another object of this invention is to provide a small and compact hydraulic gear shifting mechanism which can be added to a conventional transmission without materially increasing its bulk.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a diagrammatic view of the greater part of one of the preferred embodiments of the invention;

Figure 2 is a diagrammatic view of the remainder of the embodiment of the invention shown in Figure 1;

Figure 3 is a diagrammatic view of a portion of the invention shown in Figure 2, the parts being in a different position;

Figure 4 is a diagrammatic view of the same portion of the invention as shown in Figure 3, the parts being in still another position;

Figure 5 is a diagrammatic view on an enlarged scale of one form of speed selector valve;

Figure 6 is a diagrammatic view on an enlarged scale of one form of hand control valve by means of which the automatic mechanism is set in "ahead" position, "reverse" position, or neutral;

Figure 7 is a diagrammatic view of one form of one of the clutch control valves;

Figure 8 is a cross-sectional view of one of the preferred forms of the main clutch valve and the clutch engagement control;

Figure 9 is a cross-sectional view of one of the preferred forms of master valve controlled by the accelerator pedal;

Figure 10 is a plan view of one of the preferred forms of the part of the invention which is mounted upon the gear box and does the actual shifting of the gears;

Figure 11 is a cross-sectional view taken on the line XI—XI of Figure 10 and looking in the direction of the arrows;

Figure 12 is a horizontal sectional view through one of the cylinders and the associated valve of the portion of the mechanism shown in Figure 10.

General description

As may be seen from Figures 1 and 2, which together form a complete diagram of the embodiment of the invention illustrated, the invention comprises several different pieces of mechanism which are interconnected with each other and provided with auxiliary mechanisms in order to form a complete automatic transmission control system. In brief, the invention comprises a hydraulically operated shifter 15 which is adapted to be placed on a conventional gear box or transmission and to engage and shift the gears therein. The shifter 15 is supplied with oil or other hydraulic fluid under pressure by means of a direct acting vacuum powered pump 16 which is supplied with vacuum and caused to operate whenever the clutch pedal 17 is depressed. Which speed the gear box will be shifted into by the shifter 15 when the pump 16 is actuated is determined by a group of vacuum operated relay valves 18, 19, 20 and 21. Each of the relay valves 18, 19, 20 and 21 controls the shifting into one of the four speeds, reverse, low, intermediate, and high, and whether the reverse relay valve 18 is actuated or one of the forward relay valves 19, 20 and 21 is determined by the position of a hand control valve 24 which may be set in either "ahead," "reverse" or neutral position.

Which of the "ahead" relay valves 19, 20 and 21 is to be operated at anytime is determined by the position of an automatic selector valve 25 which is moved to the positions corresponding to the various forward speeds by means of a centrifugal governor 26 (shown in Figure 2) which is connected to rotate at a speed proportional to the speed of the vehicle. The governor 26 controls the automatic selector valve 25 through a ratchet and pawl mechanism 27 which prevents the selector valve 25 from being moved directly from first speed to third speed without stopping in the second or intermediate speed position until a shift into intermediate speed has been made.

The movement of the clutch pedal 17 is controlled directly by a clutch relay valve 28 which is combined with an automatic vent control 30 which provides different rates of engagement of the clutch according to the speed which has been selected by the hand controlled valve 24 and the automatic selector valve 25. The clutch relay valve 28, in turn, is controlled from a master valve 29 which operates whenever the accelerator 31 is entirely released by the driver of the vehicle. In order to prevent unnecessary actuation of the clutch pedal 17, a lockout valve 32 is provided to prevent actuation of the clutch relay valve 28 except when the automatic selector valve 25 is in a position to cause a gear shift. The automatic selector valve 25 and lockout valve 32 are so arranged that they can move to a position beyond that corresponding to third speed after the gears have been shifted into third speed, and in this position the lockout valve 32 prevents the clutch relay valve 28 from operating.

As mentioned above, the shifter 15 operates when it is supplied with liquid under pressure from the pump 16 which, in turn, is controlled by the depression of the clutch pedal 17, the clutch pedal 17 being, in its turn, controlled by the master valve 29. In order to prevent the clutch pedal 17 from being allowed to rise and cause engagement of the clutch before the shifter 15 has completed a shift, an interlocked mechanism is provided to hold the master valve 29 open until the completion of a shift. The details of this interlocked mechanism are described below.

The shifter

The shifter 15, which is shown in detail in Figures 10 and 11, comprises an octagonal frame 37 which is adapted to be secured to the top of a conventional gear box or transmission. The particular means used for securing the shifter in place are not shown as they form no part of the present invention and will differ for each type of gear box. The frame 37 carries a pair of parallel guides or slideways 38 extending horizontally from one end of the frame to the other. A slide 39 is mounted between the guides 38 and is provided with portions 41 which embrace the guides 38 and restrict the slide 39 to movement longitudinally of the guides 38.

The slide 39 carries within it a block 42 mounted so as to be able to slide laterally. The block 42 carries a pin or stud 43 which projects down out through an aperture 44 in the bottom of the slide 39. The pin 43 performs the same function in the gear box as the lower end of the gear shift lever in a conventional manually operated transmission, and is adapted to engage the shifting elements 45 in the same way as a conventional gear shift lever. The pin 43 is therefore provided with means to move it along the H-shaped path shown in Figure 10.

Movement along the longitudinal sides of the H is accomplished by moving the slide 39 along the guides 38. A pair of cylinders 46 and 47 are secured to the frame 37 at each end of the guides 38 and are provided with pistons and with piston rods 48 and 49 which bear against the ends of the slide 39. Thus, the admission of oil or other hydraulic fluid to one of the two cylinders 46 and 47 will move the slide 39 and the block 42 and pin 43 carried thereby longitudinally in one direction and the admission of oil or hydraulic fluid to the other cylinder will move the slide 39, block 42 and pin 43 in the other direction.

Lateral movement of the pin 43 and the block 42 which carries it is accomplished by means of a pair of side cylinders 51 and 52 secured to the sides of the frame 37. The pistons and piston rods 48 and 50 of the side cylinders 51 and 52 do not act directly upon the slides 39 but upon the sides of a two-piece outer shell 53, 54 which is carried by the slide 39 and which can slide laterally thereon. The outer shell 53, 54 extends around the slide 39 and the guides 38 and has an aperture in its lower side 54 through which the pin 43 extends, the pin being a close fit in the aperture. Thus, when oil under pressure is admitted to one cylinder 51 or the other 52 at the sides of the shifter, the outer shell 53, 54 will be moved to one side or the other and will carry the pin 43 and laterally sliding block 42 with it. Thus the pin 43 can be moved from one side to the other of its H-shaped path.

Although means might be provided for admitting pressure to the various cylinders only when they were called upon to cause movement of the pin 43, I have found that no inconvenience is caused by simultaneously admitting pressure to one end cylinder and one side cylinder and that the construction of the device can be materially simplified by causing it to operate in this manner. For example, if a shift is to be made from reverse to first, the oil or other liquid under pressure is admitted simultaneously to the rear end cylinder 47 and the left side cylinder 51 and the piston rod 49 moves the slide 39 forward while the piston rod 48 in the side cylinder 51 holds the outer shell, 53, 54 over to the right and keeps the pin or stud 53 on one leg of its H-shaped path so that it moves from reverse position to first speed position. If a shift is to be made from first speed to second speed, liquid under pressure is admitted to the front cylinder 46 and the right side cylinder 52.

During the first portion of this shift, the cylinder 52 urges the pin 43 sideways toward the other side of its H-shaped path but does not move it because the pin 43 is kept from moving from one side to the other of its H-shaped path except at the center by the shifting elements 45, which it engages, in the same way as a conventional gear shift lever is kept from moving from one side of its H-shaped path to the other except at the center. Thus, during the first part of the shift from first to second, no lateral movement takes place and the slide 39 and the block 42, pin 43 and outer shell 53, 54 are moved longitudinally by the piston rod 48 of the forward cylinder 46. When these reach the middle of the guides 38, the pin 43 is free to move sideways and the side cylinder 52, which already contains oil under pressure, immediately acts through the piston rod 50 to move the outer shell 53, 54 and the pin 43 over to the other side of the H-shaped path. During this lateral movement, the pin 43 is prevented from moving longitudinally by the shifting elements 45 in the same way as an ordinary gear shift lever is prevented from moving longitudinally while it is being swung from one side to the other of its H-shaped path, and the piston rod 48 of the end cylinder 46 is stationary. As soon, however, as the side piston rod 50 has completed its movement and the pin 43 has reached the other side of its H-shaped path, the piston rod 48 of the end cylinder 46 resumes its movement and pushes the slide 39 and pin 43 to the ends of their paths, thus completing the shift from first speed to second speed. The other shifts are made in a similar manner. Thus each of the shifts to the four different speeds requires the admission of oil under pressure to two of the four cylinders 46, 47, 51 and 52, a different pair of cylinders being utilized for shifting to each speed.

The connections for supplying oil under pressure to the four cylinders 46, 47, 51 and 52 are arranged so that it is necessary to have only four oil lines or conduits 55, 56, 57 and 58 leading to the shifter. The oil pressure line 55 through which oil is supplied to cause the shifter to move into reverse position, for example, is connected to both the left side cylinder 51 and the forward ended cylinder 46, as shown in Figures 1 and 10, so that oil supplied through this line will cause the shifting pin 43 to move into the reverse position. Similarly each of the other oil lines, 56, 57 and 58 are connected to one of the end cylinders 46 and 47 and to one of the side cylinders 51 and 52.

It will be noted that each of the four cylinders 46, 47, 51 and 52 can be supplied with oil under pressure through two of the four lines 55, 56, 57 and 58 and that means must be provided to prevent the oil supplied through one line leading to a cylinder from escaping through the other line leading to that same cylinder. For this purpose, each of the cylinders is provided with an automatic valve. Since the four automatic valves in the four cylinders are similar to each other, it will be sufficient to describe only the one associated with the forward end cylinder 46.

The head of the cylinder 46 is provided with a transverse cylindrical valve chamber 61 which communicates with the interior of the cylinder through a port 62. Each end of the valve chamber 61 is closed by a valve seat 63 which is screwed into place and which is provided with a central passage 64. The top of each valve seat 63 is provided with an upstanding cylindrical wall 65 which surrounds the opening to the central passage 64. A cylindrical valve plunger 66 is slidably mounted in the valve cylinder 61 and its ends are provided with annular recesses 67 adapted to receive the upstanding cylindrical walls 65 on the valve seats 63. The two oil lines 55 and 57 through which oil is supplied to the cylinder 46 for performing the two shifts in which this cylinder is employed are connected to the two central passages 64 in the two valve seats 63 by means of intermediate oil lines 68 and 69. Thus, when oil under pressure is supplied to the cylinder 46 through either of the oil lines 68 or 69, the valve plunger 66 is forced by the pressure of the incoming oil against the valve seat 63 opposite the valve seat 63 through which the oil is entering. Thus the valve seat 63 through which oil is not being supplied is sealed off by the plunger 66 and the escape of oil therethrough is prevented.

While any conventional or suitable means may be employed for interlocking the shifting elements 45 so that only one of them may move at a time, it has been found desirable to provide these with locking mechanism which is actuated directly by the shifter. One form of latch mechanism is shown in Figures 10 and 11 and comprises a pair of pawls 71, one for each of the shifting elements 45. The pawls 71 are mounted, one at each side of the shifter frame 37 on longitudinally extending horizontal pivots 72. Each pawl 71 is provided with a pair of upwardly extending arms 73 to which is pivoted a shoe 74 which extends in horizontally toward the center of the shifter. A spring 75 is provided to press the pawl 71 down and to simultaneously hold the shoe 74 up against the bottom of the side cylinder 51 or 52 immediately above it. The side cylinder 51 or 52 thus forms a guide for the shoe 74 and keeps it approximately horizontal as it is moved toward or away from the center of the shifter. Each shoe 74 is placed so that its edge will ride against the side of the laterally movable outer shell 53, 54 carried on the slide 39. Thus, when the outer shell 53, 54 is moved over to one side or the other by one of the cylinders 51 or 52 and moves the pin 43 into engagement with one of the shifting elements 45, the side of the shell 53, 54 will bear against one of the shoes 74 and move it sideways, thereby causing the pawl 71 associated with it to rise out of engagement with the shifting element 45. As shown in Figure 11, the shell 53, 54 has been moved to the right by the action of the oil admitted to the cylinder 51 on the left, and the shoe 74 on the right has been moved laterally and has raised the pawl 71 associated with it out of engagement with the shifting element 45 on the right. At the same time, the laterally movable outer shell, 53, 54 has moved out of engagement with the shoe 74 on the left, allowing the spring 75 to move the pawl 71 on the left down into engagement with the left-hand shifting element 45, thereby locking it in neutral position.

*The vacuum operated hydraulic pump and its connections*

The pump 16 which supplies oil or other hydraulic fluid under pressure for the operation of the shifter 15 is a single cylinder direct acting unit whose size is such that it will pump enough oil at a single stroke for one complete shift of the shifter 15. The pump 16 comprises a pump cylinder 81 secured directly above a substantially larger vacuum motor cylinder 82. The pump cylinder 81 contains a pump piston 83 which is directly connected by a piston rod 84 to a piston 85 in the vacuum cylinder 82.

The vacuum piston 85 is forced up by connecting the end of the cylinder 82 above the piston to a source of vacuum through a conduit 86, the atmosphere being allowed to act on the underside of the piston 85 through a vent 87 in the bottom of the cylinder 82. The return of the piston 85 to its lower position after the vacuum is cut off and atmospheric air allowed to return to the cylinder above the piston is accomplished by means of a weight 88 carried by the piston.

The upper part of the pump cylinder 81 is connected to a reservoir 89 through a spring loaded inlet valve 91. Thus, when the vacuum piston 85 is moved down by the weight 88 and carries the pump piston 83 down with it, liquid will be drawn through the valve 91 from the reservoir 89 to the pump cylinder 81. When the pump piston 83 is forced up by the admission of vacuum to the vacuum cylinder 82, the liquid in the pump cylinder 81 will be forced out through a spring loaded outlet valve 92 into an oil pressure conduit 93 leading to the four relay valves 18, 19, 20 and 21.

Relay valves

The four relay valves 18, 19, 20 and 21 serve to determine to which of the four conduits 55, 56, 57 and 58 liquid under pressure will be delivered by the operation of the pump 16. The four valves 18, 19, 20 and 21 are all alike, so a description of the construction and operation of one of them will serve to explain them all. The first of the four relay valves is the reverse valve 18. It comprises a cylinder having three ports spaced along its length. The upper port is connected to a branch of the oil pressure supply line 93 leading from the pump 16. The central port is connected to the reverse oil line or conduit 55 through which oil under pressure is supplied to the shifter 15 when it is desired to shift into reverse. The third or lower port is connected to a branch of an oil return line 94 which leads to the oil reservoir 89 to which the pump inlet valve 91 is connected. The cylinder of the valve 18 contains a dumbbell-shaped piston 95 whose two ends fit closely in the cylinder and whose central portion or waist provides a space between the two ends across which oil can flow. The bottom of the valve 18 is open and is provided with a spring 96 connected to the valve piston 95 to hold it in its lower position. When the valve piston 95 is in this position, the branch of the oil supply line 93 leading to the valve 18 is closed by the upper end of the valve piston 95 while the "reverse" oil line or conduit 55 and the oil-return line 94 open into the space around the waist of the piston 95 and are thus in communication with each other.

The valve piston 95 is raised to its upper position by connecting the top of the cylinder of the valve 18 to a source of vacuum through the conduit 97. When the piston 95 is in its upper position, its lower portion covers the lower port and closes the branch of the oil-return conduit 94 leading to the oil reservoir 89. At the same time, the upper port is uncovered, thus placing the branch of the oil pressure supply line 93 leading to the valve 18 in communication with the "reverse" oil line or conduit 55. Thus, when the reverse valve piston 95 is in its upper position and the oil pump 16 operates, oil under pressure will be forced through the oil pressure conduit 93, the reverse relay valve 18 and the reverse oil line 55 to the shifter 15. As will be explained in greater detail below, the means for applying vacuum to the upper ends of the relay valves 18, 19, 20 and 21 are arranged so that vacuum is applied to only one valve at a time. Thus, when the piston of one of the relay valves, such as the reverse valve 18, is in its upper position, the pistons of the other three relay valves will be in their lower position. Thus, while one of the four oil lines leading to the shifter 15, such as the reverse oil line 55, will be placed in communication with the oil pressure supply line 93 so as to receive oil under pressure from the pump 16, the other three oil lines 56, 57 and 58 leading to the shifter 15 will be in communication with the oil-return line 94 leading to the oil reservoir 89. The connection thus provided to the oil reservoir 89 is necessary because when, for example, oil is admitted to the forward end cylinder 46 of the shifter and forces the piston and piston rod 48 out of that cylinder, the piston and piston rod 49 in the opposite end cylinder 47 will be forced in, forcing the oil out of that cylinder. The oil thus forced out of the cylinder 47 will return to the oil-return line 94 and oil reservoir 89 through one or the other of the two oil supply lines 56 and 58 through which oil may be supplied to it. Through which of the two lines 56 and 58 the oil is returned depends upon the position in which the automatic valve associated with the cylinder 47 happens to be. When it is in the position shown in Figure 1, the oil will return through the first speed oil line 56 and through the first speed relay valve 19. Thus a passage is always provided for the return of oil to the oil-return line 94 and oil reservoir 89 from which ever ones of the four cylinders 46, 47, 51 and 52 of the shifter 15 happen to be opposite the cylinders which are being employed in making a shift.

From the above description, it will be apparent that, if a shift is to be made, the speed to which the shift is made is determined by which of the four relay valves 18, 19, 20 and 21 has its upper end connected to a source of vacuum so as to lift the piston within it, and it will also be apparent that the time at which the shift for which the selector valves are set is determined by when the vacuum cylinder 82 on the pump 16 is connected to a source of vacuum.

Master valve

The connection of the pump 16 and the relay valves 18, 19, 20 and 21 to a source of vacuum is accomplished by a set of control valves. The first of these is the master valve 29 through which the other control valves are connected to a source of vacuum and which is arranged to be opened only when the operator allows the accelerator pedal 31 to rise freely. As shown in Figure 9, the master valve comprises a cylinder 101 with a valve seat 102, 103 at each end, each valve seat having an upstanding cylindrical wall concentric with the cylinder and having a central aperture 108, 109. The aperture 108 in the upper seat leads directly to the atmosphere, and in addition to serving as a vent, provides a passage for a valve stem 104. The valve stem 104 is secured at its lower end to a piston 105 within the cylinder, the piston 105 being provided with annular grooves 106, 107 at each end adapted to receive the upstanding annular walls of the valve seats 102, 103. Thus, when the piston 105 is at either end of the cylinder 101, one of the grooves 106 and 107 cooperates with the valve seat 102 or 103 at that end of the cylinder to form a seal similar to a labyrinth packing, thus effectively preventing leakage.

The aperture 109 in the lower valve seat 103 is at the end of a short tube 111 concentric with the valve cylinder 101 and piston 106 and having its lower end closed by a cap 112. The tube 111 contains a helical spring 113 whose lower end is secured to the cap 112 at the bottom of the tube and whose upper end extends through the aperture 109 in the valve seat 103 and is secured to the end of the valve stem 104 projecting through the valve piston. The spring 113 is under tension so that it normally holds the piston 105 down on the lower seat 103, thus sealing off the upper end of the tube 111.

One side of the tube 111 is provided with a connection 114 which, as shown in Figure 1, leads to the intake manifold 115 of the engine 116 of the vehicle on which the automatic transmission control mechanism is used, the suction in the intake manifold being the source of power for operating the entire mechanism. Thus, when the valve piston 105 is held down on the lower seat 103 by the spring 113, the vacuum in the connection 114 to the engine manifold 115 is sealed off from the valve cylinder 101, and the valve cylinder 101 is in communication with the atmosphere through the aperture 108 in the upper seat 102. When the valve piston 105 is raised against the upper seat 102 by the valve stem 104, the opening 108 to the atmosphere will be sealed and the interior of the cylinder 101 will be connected to the source of vacuum through the opening 109 in the lower valve seat 103. The interior of the valve cylinder 101 will thus be under vacuum or vented to the atmosphere according to whether the valve stem 104 is lifted up or allowed to be pulled down by the spring 113 connected to it, and the condition within the cylinder 101 is communicated to the other elements of the transmission control mechanism through a port 117 in the side of the cylinder 101.

The stem 104 of the master valve 29 is raised, when the accelerator pedal 31 is entirely released, by means of a lever 118 connected to the valve stem and a link 119 connecting the lever 118 to the accelerator 31. The link 119 is provided with a lost motion connection 121 so that the accelerator 31 can be fully depressed without carrying the link 119 with it and yet will cause the link 119 to move in the direction to open the master valve 29 when the accelerator is fully released. The accelerator is connected by a conventional linkage 122 to the throttle 123 or other fuel control device on the engine 116 and is provided with a spring 124 to cause it to rise in the conventional manner when released. The spring 124 is, of course, strong enough to easily overcome the spring 113 in the master valve, since the latter need only be strong enough to overcome friction in the valve and its operating linkage.

Besides the linkage 118 and 119 connected to the accelerator 31 by which the master valve 29 is opened and held open, a second means is provided for holding it in open position. This second means comprises a small motor cylinder 127 directly above and concentric with the main part of the master valve 29. The valve stem 104 extends past its connection with the lever 118, which connects it to the accelerator, and up into the small motor cylinder 127 where it carries a piston 128. The top of the motor cylinder 127 is connected to a conduit 129 through which the cylinder 128 may be connected to a source of vacuum. When this is done, it is obvious that the piston 128, valve stem 104 and the valve piston 105 will be raised to their upper position or, if they are already in that position they will be held there with the valve piston 105 firmly seated against the upper valve seat 102. As may be seen from Figure 1, the lost motion connection 121 is arranged so that the master valve 29 may thus be held in open position by vacuum in the cylinder 127 irrespective of the position of the throttle 31. As will be explained below, the cylinder 127 is employed only for holding the master valve 29 in open position and not for causing it to open. Thus the master valve 29 is opened only by the release of pressure upon the accelerator pedal 31 but may, under certain conditions, be held in open position even though the accelerator pedal 31 is again depressed.

*Master valve and shifter interlock*

The small motor cylinder 127 on the master valve 29 is employed only as part of an interlock mechanism for holding the master valve open during the progress of a shift. This is done in order to keep the shifting mechanism operating until a shift is completed so that a premature depression of the accelerator pedal 31 will not cut off the supply of vacuum power to the automatic transmission mechanism. As shown diagrammatically in Figure 1 and with greater exactness in Figure 10, the portion of the interlock mechanism on the shifter 15 comprises a pair of levers 131 and 132 which are pivoted upon one of the guides 38 and which extend across the ends of the path of the slide 39. The two levers 131 and 132 are connected together by a link 133 so that they will swing in opposite directions, that is, when one lever 131 swings away from the center of the shifter toward the rear of the shifter the other lever 132 will also swing away from the center of the shifter and toward the front of the shifter.

The linkage formed by the two levers 131 and 132 and the link 133 is connected to the stem 134 of an interlock valve 135 mounted on the frame of the shifter. The interlock valve 135, shown diagrammatically in Figure 1, is similar in its interior construction to the main portion of the master valve 29 shown in detail in Figure 9, except that it is not provided with a spring in its interior, tending to pull the valve stem into the valve. Instead a spring 136 is connected to the linkage 131, 132, 133 which operates the valve stem 134 in such a way as to tend to pull the valve stem 134 out of the valve 135 and to close the atmospheric vent of the valve through which the valve stem 134 extends.

The interlock valve 135 is provided with two connections, one leading to a port in the side of the valve cylinder and the other leading to an aperture in the valve seat at the end of the valve opposite the end through which the valve stem 134 extends. The latter connection 137 leads to the main vacuum supply line 114 so that when the two levers 132 and 131 are swung together by the spring 136, the valve stem 134 will be pulled out, causing the atmospheric vent to be sealed and placing the interior of the valve 135 in direct communication with the source of vacuum.

The conduit 129 leading from the port in the side of the valve 135 is the conduit connected to the top of the small motor cylinder on the master valve 29. Thus, when the two small levers 131 and 132 on the shifter 15 are swung toward each other, the interlock valve 135 will allow suction from the engine manifold 115 to be applied to the small motor cylinder of the master valve 29 and hold the master valve open irrespective of whether the throttle 31 is allowed to remain in its released position or not.

In order to cause the master valve 29 to be held open at the proper time, the laterally slidable outer shell 53, 54 on the slide 39 of the shifter is provided on its upper surface with a pair of upwardly projecting pins 138 and 139 which are placed so as to engage lugs 141, 142, 143, 144 on the levers 131 and 132. The pins 138 and 139 carried by the laterally slidable outer shell 53, 54 of the shifter are placed so that one pin 138 engages the lugs 141, 143 on one lever 131, and the other pin 139 engages the lugs 142 and 144 on the other lever 132. Thus a different one of the four lugs, 141, 142, 143 and 144 is engaged upon the completion of each shift. Thus each lug can be made to have exactly the proper length to cause the interlock valve 135 to close just as the shift associated with that lug is completed, even though the distance which the slide 39 moves is different when shifting into one speed than when shifting into another speed. Thus, during every shift the interlock valve 135 will be held open by the spring 136 until the shift is completed.

*Hand operated control valve*

In order that the operator of the motor vehicle may be able to choose whether the vehicle shall move forward or backward or remain stationary with the engine running, a hand operated control valve 24 is provided. This valve is located in any convenient location, such as on the instrument board, and may be placed in three positions. In one position, the one in which it is shown in Figure 1 and, in full lines in Figure 6, it forms the proper connections so that the transmission controlled mechanism will cause the vehicle to move in a forward direction. In another position, the one shown in dotted lines in Figure 6, it forms the connections which will cause the vehicle to move in a reverse direction. In an intermediate position, which serves as a "neutral," the vehicle will move in neither direction. The valve 24 may be of any one of several different types but, for the sake of convenience in illustration, it has been shown as a simple rotary valve somewhat similar to a common stopcock. The central portion of the valve is rotatable and contains two sets of passages which function entirely independently of each other. One set of passages 147 and 148 is T-shaped in plan and serves to connect the vacuum conduit 149 from the master valve 29 to either the "reverse" vacuum conduit 97 or to the "ahead" vacuum conduit 151 leading to the automatic selector valve 25, depending upon whether the hand valve 24 is in the "ahead" or "reverse" position. When the valve 24 is in the neutral position, neither the "ahead" vacuum conduit 151 nor the "reverse" vacuum conduit 97 is connected to the vacuum conduit 149 but both are connected to the atmosphere through a vent 152.

The other set of passages 153 in the valve 24 are somewhat similar to a W in plan, and serve to control a latch 154 for the clutch pedal 17. The latch 154 is placed so as to engage a detent 155 on the clutch pedal 17 when the clutch pedal is fully depressed and the clutch is disengaged. The latch 154 is provided with a spring 156 which urges it into engagement with the detent 155 and is also provided with a small motor cylinder 157 which will release the latch when the cylinder is connected to a source of vacuum. Whenever the hand operated valve 24 is in either its "ahead" or "reverse" position, the W-shaped passages 153 form a connection between a conduit 158 leading to the intake manifold 115 and a conduit 159 leading to the small motor cylinder 157 for withdrawing the latch 154. The W-shaped passages 153 are arranged so that when the valve 24 is in its intermediate or "neutral" position, the conduit 158 which supplies vacuum is cut off and the conduit 159 from the latch motor 157 is connected to a vent 161, thus deenergizing the motor 157 and allowing the spring 156 to move the latch 154 into engagement so that it will hold down the clutch until the hand operated valve 24 is moved to either its "ahead" or "reverse" position. It may be pointed out that the control for the latch 154 is arranged so that the latch will remain in engagement after the motor 116 is stopped and its intake manifold 115 ceases to be a source of vacuum.

*Automatic selector valve*

The automatic selector valve 25 is what determines which of the three forward speeds are to be engaged by the shifter 15. This valve may obviously be of many different forms such as a piston valve, rotary valve, or a plurality of poppet valves operated by cams or other means, but it has been shown, for the sake of simplicity, as a simple rotary valve, somewhat similar to an ordinary stopcock.

The rotary portion of the automatic selector valve 25 contains a three branched passageway 162 by means of which the "ahead" vacuum conduit 151 can be connected to the low speed vacuum conduit 163, the intermediate speed vacuum conduit 164 or the high speed vacuum conduit 165. The three branched passage 162 and the ports leading to the "ahead" vacuum conduit and to the low, intermediate and high vacuum conduits are placed so that the low, intermediate and high vacuum conduits, are successively placed in communication with the "ahead" vacuum conduit 151 as the valve 25 is rotated.

As may be seen in Figure 5, the ports of the various vacuum conduits leading to the valve 25 are arranged so that there is an appreciable angle between the position of the valve in which the "ahead" vacuum conduit is connected to one of the three speed conduits 163, 164 and 165 and the position in which it is connected to the next one of the three speed conduits 163, 164 and 165. When the valve is in one of these intermediate positions, the three-branch passage 162 in the rotary part of the valve is still connected to one of the three forward speed vacuum conduits 163, 164, 165 through one of its branches which has an enlarged end and another of its branches is connected to ports leading to a vent 166. Thus, as the valve 25 is rotated from its low speed position, shown in full lines in Figure 5, the low speed vacuum conduit 163 is disconnected from the "ahead" vacuum conduit 151 and is connected to the vent 166 as shown by dotted lines in Figure 5. This allows atmospheric pressure to reach the upper end of the cylinder of the low speed relay valve 19 and permits the spring 167 to move into its "off" position irrespective of whether the master valve 29 is open or not. In a similar manner, the intermediate speed vacuum conduit 164 and the high speed vacuum conduit 165 are connected to the vent 166 when the valve 25 is at either side of the positions in which they are connected to "ahead" vacuum conduit 151. Thus, in every case, after a shift has been made and the selector valve 25 is moved toward a position to cause another shift to be made, the relay valve 19, 20 or 21 which was involved in the completed shift is vented to atmosphere and allowed to return to its "off" position.

The rotor of the automatic selector valve 25 is provided with an arm 168 by means of which it is moved from one position to another. The arm 168 is connected by a link 169 to a speed responsive mechanism which operates the valve 25 and which will be described in detail below.

*Automatic clutch control*

Although the clutch 17 may be depressed when desired by the foot of the operator of the motor vehicle, the invention, in its preferred form, includes a mechanism for automatically depressing the clutch pedal 17 and thereby disengaging the clutch whenever the operator completely releases the accelerator pedal 31. This mechanism comprises a vacuum motor cylinder 172 containing a piston 173 which is connected by means of a piston rod 174 and a link 175 to the clutch pedal 17. Thus, whenever the cylinder 172 is connected to a source of vacuum, the piston 173 will be drawn into the cylinder and the clutch will be disengaged. The connection of the cylinder 172 to the intake manifold 115 of the engine 116, which is the source of vacuum, is accomplished through a clutch relay valve 28 and the master valve 29, and the rate at which air is allowed to reenter the cylinder 172 after the vacuum is cut off is determined by a clutch engagement control 30, all of which will be described in greater detail below.

*Clutch relay valve and clutch engagement control*

The clutch relay valve 28 and the clutch engagement control 30 are preferably formed in a single unit as shown in detail in Figure 8. The clutch relay valve 28 comprises a cylinder 177 having valve seats 178 and 179. The two valve seats 178 and 179 are formed with upstanding circular walls and central apertures and cooperate with a piston 181 in the valve cylinder 177 in the same way as the similar parts of the master valve 29 shown in Figure 9. The aperture in the upper valve seat 178 is connected to the vacuum conduit 149 leading from the master valve 29 and the aperture in the lower valve seat 179 is connected to a vent 182 in the clutch engagement control 30. Thus, when the piston 181 is in its lower position and the master valve 29 is open, the space within the cylinder 177 will be connected through the conduits 149 and 114 to the intake manifold 115 which is the source of vacuum. When the piston 181 is in its upper position against the seat 178, the vacuum will be cut off and the space within the cylinder 177 will be filled with air at atmospheric pressure reaching it through the vent 182. The cylinder 177 is provided with a port 183 in its side which is connected by a conduit 184 to the clutch motor cylinder 172. Thus, when the valve piston 181 is down on the lower seat 179 and the master valve 29 is open, the clutch operated by the pedal 17 will be disengaged, and when the piston 181 rises to its upper seat 178 the clutch will reengage.

The piston 181 is moved from one position or the other by means of a valve rod 185 which extends out to a small vacuum motor cylinder 186.

The cylinder 186 contains a piston 187 secured to the valve rod or stem 185 and a spring 188 under the piston 187 and urging it upward.

Vacuum is admitted to the cylinder 186 through a conduit 189 which is connected to the vacuum conduit 149 from the master valve 29 through a clutch lockout valve 32. Thus, when the lockout valve 32 is open, the cylinder 186 will be connected to the source of vacuum 115 whenever the master valve is opened, and the valve piston 181 of the clutch relay valve 28 will move practically in synchronism with the master valve 29. This will cause the clutch pedal 17 to be depressed whenever the accelerator pedal 31 is entirely released, excepting when the clutch lockout valve 32 is closed. The construction and function of the clutch lockout valve 32 will be described in detail below.

The clutch engagement control 30, which is formed in a unit with the clutch relay valve 28 and which is illustrated in detail in Figure 8, comprises a cylinder 191 into one side of which opens the circuit 192 leading from the aperture in the lower valve seat 179 of the clutch relay valve 28. The wall of the cylinder 191 contains a port or vent 182 which is offset longitudinally of the cylinder from the end of the conduit 192. The vent 182 is partially closed by a piston 193 which is slidable within the cylinder 191 and which is fixed to a piston rod 194 extending out through both ends of the cylinder 191. A pair of slightly larger cylinders 195 and 196 are carried, one at each end of the cylinder 191 and contain pistons 197 and 198 secured to the ends of the piston rod 194. The outer ends 201, 202 of the two cylinders 195 and 196 carry setscrews 203, 204 which project into the cylinders 195 and 196 and form stops against which the ends of the piston rod 194 may abut. Thus the possible range of movement of the piston and piston rod assembly 193, 194, 197, 198, may be accurately adjusted for the purpose of controlling the range of movement of the piston 193. The piston 193 partly covers the port 182 which serves as the vent through which the cylinder 172, which operates the clutch pedal 17, receives air at atmospheric pressure. Thus the position of the piston 193 determines the size of the vent 182 and will therefore determine the rate at which the clutch pedal 17 rises and the clutch engages.

Two positions are provided for the piston 193 in order to provide two different rates of clutch engagement.

In order to give a slower rate of clutch engagement when the gear box is in low or reverse, the left-hand end of one vacuum cylinder 196 is connected by means of a conduit 205 to the low speed vacuum conduit 163 and the left-hand end of the other vacuum cylinder 195 is connected by means of another conduit 206 to the "reverse" vacuum conduit 97. Similarly the right-hand ends of the two vacuum cylinders 195 and 196 are connected by conduits 207 and 208 to the intermediate speed and high speed vacuum conduits 164 and 165. Thus, as soon as the hand control valve 24 or the automatic selector valve 25 is set to give a shift into any particular speed and vacuum is admitted to operate the proper relay valve 18, 19, 20 or 21, vacuum will also be admitted to one end or the other of one or the other of the two cylinders 195 and 196 and the piston 193 controlling the clutch rate of engagement vent 182 will be moved into the position corresponding with the speed for which the transmission mechanism is set.

Clutch lockout valve

The clutch lockout valve 32 is similar in its general construction to the automatic control valve 25 and is arranged to be operated simultaneously with it. If desired, the two valves may be operated by a single shaft or they may be constructed as a single unit, but, for the purpose of illustration, they are shown in the drawings as two separate valves side by side, and the clutch lockout valve 32 is provided with an arm 209 connected by a link 211 to the similar arm 168 on the automatic control valve 25. Thus the two valves will rotate together. The clutch lockout valve 32 is connected by a conduit 189 to the cylinder 186 and by conduits 212, 213 and 149 to the master valve 29 and is provided with a three-branch passage 214 for connecting the conduits 189 and 212 together.

As may be seen from Figure 7, the ports with which the three-branch passage 214 in the rotary part of the valve 32 cooperate are placed so that the conduit 189 is connected to the conduit 212 and the clutch relay valve motor cylinder 186 is connected to the master valve 29 only when the lockout valve 32 is in certain positions. These positions are arranged so that the communication is established only when the automatic selector valve 25 is in one of the three positions corresponding to the three forward speeds, namely, low, intermediate and high. It may also be noted that one branch of the passage 214 in the rotary element of the valve 32 communicates with ports leading to a vent 215 whenever the valve 32 is not in a position corresponding to one of the three speeds. For example, when the valve 32 is turned from its low speed position and is half way between its low speed position and its intermediate speed position, the three-branch passage 214 will be in the position shown by the dotted lines in Figure 7, and the conduit 189 will be connected to the vent 215, and will not be connected to the conduit 212 leading to the master valve 29. In a similar manner, a similar connection is made when the valve 32 is between its intermediate and high speed positions or when it is moved beyond its high speed position.

The provision for disconnecting the conduit 189 through which the clutch relay valve 28 is operated and the conduit 212 leading to the master valve 29 when the valve 32 is moved to a position beyond its high speed position is especially important because it prevents the unnecessary disengagement of the clutch each time the accelerator 31 is released when the gear box is in high speed and the vehicle speed is such that no shift is to be made.

The clutch lockout valve 32 is moved to the position beyond third speed by the same mechanism which moves it and the automatic selector valve 25 to the positions corresponding to "low," "intermediate" and "high" speeds. This mechanism will be described in detail below.

Shifter actuating valve

As has been explained above, the speed of the gear box which will be placed in engagement by the shifter 15 is determined by the operation of the hand control valve 24, the automatic selector valve 25 and the relay valves 18, 19, 20 and 21, and the time at which any selected shift is made is determined by the operation of the vacuum operated pump 16. The pump 16, in turn, is controlled by a shifter actuating valve 217. The shifter actuating valve 217, shown diagrammatically in Figure 1, just below the clutch pedal 17, is similar in its construction to the master valve 29 which is shown in detail in Figure 9, but it is not provided with a small motor cylinder similar to the cylinder 127 associated with the master valve 29. The valve stem 218 of the shifter actuating valve 217 is connected to a lever 219 which is pivoted so that one end is closely adjacent the piston rod 174 through which the clutch pedal 17 is depressed. The piston rod 174 is provided with a laterally extending lug 221 placed so as to engage the end of the lever 219 at the end of the downward movement of the clutch pedal 17. This moves the lever 219 and lifts the valve stem 218 and moves the piston 222 of the shifter actuating valve 217 from its lower to its upper position. This opens the valve 217 and places the conduit 86 leading to the vacuum motor cylinder of the pump 16 in communication with the conduit 223 leading to the intake manifold 115 which serves as a source of suction. Thus, whenever the clutch pedal 17 is depressed and the clutch disengaged, vacuum will be applied to the cylinder 82 of the pump unit and the oil or other hydraulic liquid in the pump cylinder 81 and in the oil pressure conduit 93 will be placed under pressure. A shift will then be made if one of the relay valves 18, 19, 20, or 21 is in its upper position, but no shift will be made nor will any movement of the pump 16 take place if the various control valves are not in such a position as to cause one of the relay valves to be actuated.

General operation of control valves, clutch operating mechanism and shifter

Before proceeding to a description of the governor mechanism which determines the position of the automatic control valve 25 and the clutch lockout valve 32, it may be well to recapitulate the operation of that portion of the system which has been thus far described.

The hand valve 24 and the automatic selector valve 25 together determine which speed, if any, of the gear box is to be placed in engagement. The hand valve 24 may be in neutral position in which case vacuum cannot reach any of the selector valves 18, 19, 20 or 21 and no shifts can take place. When the hand valve is in this position, the clutch latch 154 is in a position to hold the clutch pedal 17 in its depressed position and hold the clutch out of engagement. This provides for a "neutral" position. When the hand valve 24 is moved in either direction from its neutral position to either its "ahead" or its "reverse" position, the latch 154 is withdrawn by the admission of vacuum to the cylinder 157. Assuming that the engine 116 is idling and the accelerator pedal 31 is in its elevated or released position, the master valve 29 will be open and vacuum will be applied to the actuating cylinder 186 of the clutch relay valve 28 and, through the clutch relay valve 28 to the clutch vacuum motor cylinder 172, thus holding the clutch pedal 17 in its depressed position even though the latch 154 is released.

If, at this time, the vehicle is at rest as has been assumed, the automatic selector valve 25 will be in the position shown in Figure 1. Therefore, depending upon whether the hand actuated valve 24 was turned to its "ahead" or "reverse" position either the low speed relay valve 19 or the reverse speed relay valve 18 will be actuated. As soon as this happens, the oil pressure duct 93 is placed in communication with either the low speed oil line 56 or the reverse speed oil line 55. At this time, since the clutch 17 is being held in its depressed position, the shifter actuating valve 217 will be opened and the pump cylinder 82 will be in communication with the source of vacum 115 through it, and the oil in the oil pressure line 93 will be under pressure. Therefore, the shifter 15 will operate to engage the gear ratio selected unless that gear ratio happens to be already in engagement, in which case no further movement of the shifter 15 can take place.

When the throttle or accelerator pedal 31 is depressed, the master valve 29 closes. This cuts off the vacuum from the motor cylinder 186 of the clutch relay valve 28 which thereupon closes the vacuum connection 149 and opens the passage to the vent 182, thus allowing the clutch pedal 17 to rise and the clutch to come into engagement. The rate of engagement is determined by the clutch engagement control 30 which has already been placed in the position corresponding to the speed selected, this having been done through its connections through the vacuum conduit leading to the four relay valves 18, 19, 20 and 21.

As soon as the clutch pedal 17 rises, the shifter actuating valve 217 is allowed to close, cutting off the vacuum from the cylinder 82 which operates the oil pump. This allows the weight 88 on the oil pump motor piston 85 to pull the motor piston 85 and the pump piston 83 down to their lower positions, filling the pump cylinder 81 with oil from the reservoir 89. The system is then ready to perform another shift.

Another shift is not made until two things take place, the moving of the manually operated valve 24 or the automatic selector valve 25 to a position to select a different speed from the one in engagement and the opening of the master valve 29. If the master valve 29 is opened while the manually operated valve 24 and the automatic selector valve 25 are in the position corresponding to the speed which is already in engagement, the clutch control mechanism will operate, depressing the clutch pedal 17, but no shifting will take place. If the master valve 29 is opened after the automatic selector valve 25 has been moved from the position corresponding to the speed in engagement but has not been moved far enough to reach the position corresponding to the next speed, the opening of the master valve will have no effect whatever. In these circumstances the clutch lockout valve 32 will be in an off position and will prevent suction from reaching the operating cylinder 186 of the clutch relay valve 28, thus preventing operation of the clutch and opening of the shifter actuator valve 217.

If the automatic selector valve 25, for example, reaches the position corresponding to second speed without the master valve 29 being opened, nothing will take place because the vacuum for operating the clutch motor 117 will be cut off both at the master valve 29 and at the clutch relay valve 28.

When, for example, the vehicle has been accelerated in low speed and the automatic selector valve 25 has reached the position corresponding to second speed and the operator of the motor vehicle desires to shift into second speed, he releases his foot from the accelerator pedal 31, allowing it to rise completely. This causes vacuum to be admitted to operate the intermediate speed relay valve 20 and to operate the clutch relay valve 28. As soon as the clutch is disengaged, it operates the shifter actuating valve 217 and a shift takes place as before, the shift in this case being into intermediate speed. In a similar manner, shifts are made from intermediate into high and back from high into intermediate and from intermediate to first, all in accordance with the positions of the hand operated valve 24, the automatic selector valve 25 and the operation of the master valve 29.

*Governor mechanism*

The automatic selector valve 25 and the clutch lockout valve 32 are operated by a governor 26 through a ratchet and pawl mechanism 27 and a link 169. The governor 26 is of the centrifugal type and consists of a pair of flyweights 225 carried by a vertical shaft 226. The shaft 226 is arranged to be driven by any suitable mechanism at a speed which is proportional to the speed of the vehicle. The flyweights 225 are connected to a non-rotating collar 227 on the governor shaft 226 so that, as they rotate and are moved outward by centrifugal force, they lift the collar 227. Upward movement of the collar 227 is opposed by a weight 228 which is connected to it by a rod 229. A second weight 231 is supported on a rest 232 and is arranged to be picked up by the weight 228 on the rod 229 as the rod 229 rises. Thus the weight 229, which is the only weight which acts on the governor at low speed, can be made lighter than otherwise, thus making the governor more sensitive at low speed.

The collar 227 of the governor 26 is connected to a ratchet plate 233 by a link 234 so that the ratchet plate 233 will swing about a central pivot 235 as the governor weights 225 and the collar 227 rise. The ratchet plate 233, in turn, is connected to the link 169 which actuates the automatic selector valve 25 and the clutch lockout valve 32. Adjacent one edge of the ratchet plate 233 is a pawl carrier 235 which is carried on a pivot 236 or other means which will allow it to move toward or away from the ratchet plate 233. A spring 237 urges the pawl carrier 235 toward the ratchet plate 233 and a stop 238 prevents it from moving closer than a certain predetermined distance.

Mounted on the pawl carrier 235 are two pivoted pawls 239 and 241 spaced a short distance apart and extending toward the ratchet plate 233. The two pawls 239 and 241 are urged in opposite directions by a spring 242 and are prevented from moving past their operative positions under the influence of the spring 242 by a pair of stops 243 and 244 carried by the pawl carrier 235.

The ratchet plate 233 is provided with three detents or teeth 244, 245 and 246 which project out so as to engage the pawls 239 and 241 when the pawl carrier 235 is held against its stop 238 by the spring 237. Two of the detents 244 and 245 are placed on the ratchet plate 233 in such a position as to engage the two pawls 239 and 241 when the ratchet plate 233 is exactly in the position corresponding to intermediate speed, that is, to the intermediate speed position of the automatic selector valve 25.

Since one pawl 239 is prevented by its stop 243 from swinging in one direction and the other pawl 241 is prevented by its stop 244 from swinging in the other direction, one or the other of the two detents 244 and 245 will come up against a pawl 239 or 241 which will not swing out of its way when the ratchet plate 233 reaches the intermediate or second speed position, no matter whether this position is reached from a movement up from slow or first speed position or a movement down from third or high speed position. For example, in Figure 2, the ratchet plate 233 is shown in the low or first speed position and in Figure 3 it is shown after having moved to second or intermediate speed position, and further movement is prevented by the detent 245 which has come up against the pawl 241. The pawl 241 cannot swing out of the way because it is restrained by the stop 244. The other pawl 239 has been pushed aside against the tension of the spring 242 and thus is not operative in this position.

Figure 2 represents the position of the governor 26 and ratchet and pawl mechanism 27 when the vehicle is at rest. When the ratchet plate 233 is in the position shown in this figure, the selector valve 25 is in low speed position. Therefore, when the vehicle starts, it starts out in low speed. As the vehicle speeds up, the governor weights 225 rise and swing the ratchet plate 233 toward the position shown in Figure 3. When the ratchet plate 233 reaches the position shown in Figure 3, the selector valve 25 is in its intermediate speed position, and a shift to intermediate speed position will be made if the accelerator petal 31 is fully released.

If, after the ratchet plate 233 reaches the intermediate speed position shown in Figure 3, the operator of the vehicle continues to accelerate and keeps the accelerator pedal 31 depressed, no shift will take place and the vehicle will continue to accelerate in low or first speed. It may be accelerated in this gear or speed to whatever speed the operator may desire and the vehicle may be capable of, but the ratchet plate 233 will not move beyond the intermediate speed position shown in Figure 3, being held in this position by the pawl 241 and the detent 245. Therefore, no matter to what speed the vehicle is accelerated in low gear, a shift into intermediate gear will take place when the accelerator pedal 31 is released. This prevents shifts from being made from low gear directly into high gear without going through intermediate gear.

When a shift from low gear to intermediate gear takes place, it is necessary to release the ratchet plate 233 so that it may move on to high gear position. This is accomplished by a small vacuum cylinder 255 which is connected to the source of vacuum 115 through a conduit 213 and the master valve 29. The cylinder 255 contains a piston 246 on the end of a piston rod 247 and a spring 250 acting to normally retract the piston rod 247. The vacuum conduit 213 is connected so as to cause the piston rod 247 to move out of the cylinder 245 when vacuum is applied. The end of the piston rod 247 is formed into a hook 248 which is adapted to engage a hook shaped pawl 249 pivotally mounted upon the pawl carrier 235. The hook shaped pawl 249 is normally held in a position to be engaged by the hook 248 on the piston rod 247 by a spring 251 and is prevented from moving beyond that position by a stop 252. Thus, whenever the master valve 29 is open to allow a shift to be made, vacuum will be applied through the conduit 213 to the cylinder 241 and the hook end 248 of the piston rod 247 will move forward and engage the hook end of the pawl 249 as shown in Figure 3. After the shift is completed and the master valve 29 closes, cutting off the conduit 213 from the source of suction 115, the spring 250 will retract the piston rod 247, pulling back with it the hook shaped pawl 249 and the entire pawl carrier 235, to the position shown in Figure 4. This movement withdraws the pawl 241 from engagement with the detent 244 on the ratchet plate 233 and allows the ratchet plate 233 to move on past its intermediate speed position as shown in Figure 4. However, as soon as this movement occurs, the hook shaped pawl 249 is swung out of engagement with the hook shaped end of the piston rod 247 by a disengaging pin 253 against which a cam surface on the hook shaped pawl 249 comes into contact as the hook shaped pawl 249 is pulled back by the piston rod 247. This action is shown in Figure 4, and as soon as the disengagement is completed, the pawl carrier 235 is swung back to its original position, shown dotted in Figure 4, by means of the spring 237.

When the pawl carrier 235 returns to the position shown in dotted lines in Figure 4, the ratchet plate 233 has moved past the intermediate speed position to approximately the position shown in Figure 4 and the pawl 241 which formerly engaged the detent 245 and prevented movement of the ratchet plate 233 now swings in out of engagement with the detent 245. Thus the ratchet plate 233 is free to move to its high or third speed position under the influence of the governor 26.

Movement of the ratchet plate 233 past the third speed position while the gear box is still in second gear is prevented by the third detent 246 which engages the pawl 241 in the same manner as the second detent 245 engaged the pawl 241 as shown in Figure 3. Thus the ratchet plate 233 is prevented from going beyond its third speed position until a shift into third speed is made in exactly the same way as it was prevented from going beyond its second speed position until a shift into second speed was made. When the shift into third speed is made, the ratchet plate 233 is released to move beyond third speed position by the action of the cylinder 255 in the same way as it was released to move beyond second speed position when a shift into second was made. This moves the clutch lockout valve 32 into its "beyond third speed" position and prevents unnecessary operation of the clutch after the gear box has been placed in third gear. Movement of the ratchet plate 233 in this direction is limited by a suitable stop 255.

In shifting down from third speed to first speed, a similar action takes place, the detent 244 cooperating with the pawl 239 in the same way as the detent 245 cooperated with the pawl 241 in shifting up from first speed through second speed into third speed. This insures that second speed will not be omitted and an attempt made to shift directly from high gear into low gear.

From the above description and the accompanying drawings, it will be seen that I have provided an automatic transmission control mechanism, using the word "transmission" in its broadest sense as including both the clutch and the gear box, and that the mechanism which I have provided is adapted for use with conventional clutches and gear boxes. It will thus be seen that my automatic transmission control mechanism does not require extensive changes in the design of automobiles or their power plants. It will also be apparent that this mechanism can be applied to existing cars as an accessory or applied to cars being manufactured and sold as de luxe equipment, and that the installation of this mechanism in an automobile of conventional design is relatively simple.

While I have described my automatic transmission control mechanism as applied to an automobile having a gasoline engine, the control mechanism may obviously be employed with other transmissions and with other types of engines. For example, it may be used to control the transmission of a Diesel-mechanical rail car, a separate source of vacuum being provided to operate the control mechanism.

Although I have described my automatic transmission control mechanism as being operated by suction or vacuum, it will be apparent that the entire system can be constructed to operate by compressed air in place of vacuum and such an arrangement may be desirable in applying the system to vehicles, such as trucks or buses, having compressed air for the operation of the brakes or other purposes.

It is also apparent that, while I have described my automatic transmission control mechanism as being applied to a transmission having a three speed gear box, it may be designed for use with a transmission having a two speed or a four speed gear box or with any other number of speeds.

While I have shown one particular embodiment of my invention and discussed a few other possible embodiments or modifications, it will, of course, be understood that I do not wish to be limited thereto since many other modifications may be made, and I therefore contemplate by the appended claims to cover all such modifications as fall within the true spirit and scope of my invention.

I claim as my invention:

1. In an automatic control mechanism for a motor vehicle having a gear box, a selector member movable between three successive positions which correspond to three successive ratios which may be made operative in the gear box, power means for making operative whatever gear ratio corresponds to the position of the selector member, a manually operable control member for setting said power means into action, latch means for preventing the movement of said selector member past the intermediate one of said three successive positions, and means responsive to the operation of said control member for releasing said latch means immediately after said operation.

2. In an automatic control mechanism for a motor vehicle having a gear box, a selector member movable between three successive positions which correspond to three successive ratios which may be made operative in the gear box, power means for making operative whatever gear ratio corresponds to the position of the selector member, a manually operable control member for setting said power means into action, latch means for preventing the movement of said selector member past the intermediate one of said three successive positions, and means responsive to the making operative of a gear ratio for releasing said latch means after said gear ratio is made operative.

3. In an automatic control mechanism for a motor vehicle having a clutch and a gear box, a selector member movable between and beyond three successive positions which correspond to three successive ratios which may be made operative in the gear box, means responsive to the speed of the vehicle for moving said selector member through and beyond its successive positions as the speed of the vehicle increases, power means for disengaging the clutch, power means set into action by the disengagement of the clutch for making operative whatever ratio corresponds to the position of the selector member, a manually operable control member for putting said first power means into action, latch means for preventing the movement of said selector member past the intermediate one of or beyond said three successive positions, means for preventing the operation of said clutch disengaging means when said selector is beyond said positions, and means responsive to the making operative of any of said ratios for momentarily releasing said latch means.

4. In an automatic control mechanism for a motor vehicle having a clutch and a gear box, a selector member movable between and beyond three successive positions which correspond to three successive gear ratios which may be made operative in the gear box, power means for disengaging the clutch, power means set into action by the disengagement of the clutch for making operative whichever gear ratio in the gear box corresponds to the position of the selector member, a manually operable control member for putting said first power means into action, latch means for preventing the movement of said selector member past the intermediate one or beyond one of the outer ones of said three successive positions, and means responsive to the operation of said control member for releasing said latch means.

5. In an automatic control mechanism for a motor vehicle having a clutch and a gear box, a selector member movable between and beyond three successive positions which correspond to three successive gear ratios which may be made operative in the gear box, power means for disengaging the clutch, power means set into action by the disengagement of the clutch for making operative whichever gear ratio in the gear box corresponds to the position of the selector member, a manually operable control member for putting said first power means into action, latch means for preventing the movement of said selector member past the intermediate one or beyond one of the outer ones of said three successive positions, means for preventing the operation of said clutch disengaging means when said selector member is beyond said positions, and means responsive to the making operative of a gear ratio for releasing said latch means.

6. In a control mechanism for a motor vehicle having an engine, a clutch, and an automatically controlled gear box, a latch for holding the clutch out of engagement, a manually operable control member, power means controlled by said control member for setting said gear box to move the vehicle ahead when said control member is in one position and for setting said gear box to move the vehicle back when said control member is in another position, and means responsive to the position of said control member for releasing said latch when said control member is in either of said positions and for making said latch operative when said control member is in neither of said positions.

7. In a motor vehicle having a clutch, a gear box and a manually operable power control member, an automatic control mechanism comprising power means for disengaging the clutch and changing the gear ratio of the gear box, means responsive to the speed of the vehicle for determining the gear ratio to be made operative, and means for making said power means inoperative when said gear box is in direct drive and said vehicle is moving faster than a predetermined speed.

8. In an automatic control mechanism for a motor vehicle having an accelerator and a clutch and a gear box, power mechanism for disengaging said clutch, power shift mechanism operative upon disengagement of the clutch for selectively engaging the gears in the gear box, selector means responsive to the speed of the vehicle for determining the gears to be engaged, and means for making said clutch disengaging means inoperative when said selector means is not set to permit operation of said power shift mechanism.

9. In an automatic control mechanism for a motor vehicle having an engine and a clutch and a gear box with a plurality of ratios, a vacuum cylinder for disengaging the clutch when vacuum is applied thereto, a vent for breaking said vacuum and allowing said clutch to engage, power mechanism for making operative any one of the ratios of the gear box, selector mechanism for determining the ratio to be made operative, and means operated by said selector mechanism for partially closing said vent in certain positions of said selector mechanism for providing a slower rate of clutch engagement for said positions of said selector mechanism.

10. In an automatic control mechanism for a motor vehicle having an engine and a clutch and a gear box with a plurality of ratios, power mechanism for making operative anyone of the ratios of the gear box selector mechanism for determining the ratio to be made operative, a vacuum cylinder for disengaging the clutch when vacuum is applied thereto and for allowing it to engage when air is admitted thereto, means for selectively connecting said cylinder to a source of vacuum or to a vent to air at atmospheric pressure, and means operated by said selector mechanism for varying the opening of said vent for different positions of said selector mechanism.

11. In an automatic transmission, a gear shift member adapted to selectively engage and move the shiftable members of a transmission, clutch disengaging mechanism preventing the application of power to said transmission, power shifting mechanism for moving said gear shift member between several predetermined positions, control means operated by said clutch disengaging mechanism for shutting off the power to said shifting mechanism except when said clutch disengaging mechanism is operative, manually operable control means for said clutch disengaging mechanism, means for holding said manually operable control means in a position to cause clutch disengagement, and means for operating said holding means whenever said shift member is in none of said predetermined positions.

12. In a power gear shifter, a gear shift member adapted to selectively engage and move the shiftable members of a transmission, power means for moving said gear shift member between several predetermined positions, manually operable control means for shutting off the power to said power means, and means for holding said control means out of its off position whenever said shift member is in none of said predetermined positions.

13. In a control mechanism for a motor vehicle having an engine, a clutch, and a gear box providing a reverse gear train and at least three of forward gear trains of different ratios, fluid pressure operated means for selectively making said gear trains effective, manual control means for directing fluid pressure selectively to make either said reverse gear train or one of said forward gear trains effective, means for selecting the particular forward gear train to be made effective, speed responsive mechanism for operating said selecting means, and means responsive to the operation of said fluid pressure operated means for positively preventing operation of said selecting means from a position corresponding to any gear ratio to a position corresponding to a non-adjacent ratio without an intervening operation of said fluid pressure operated means with said selecting means in the position corresponding to the intervening ratio.

14. In a vacuum operated power mechanism for shifting the gears of a transmission, a plurality of hydraulic motor cylinders and pistons, a mechanical interlock for preventing simultaneous movement of certain pairs of said pistons, means for operatively connecting said pistons to said gears, a hydraulic pump cylinder and a vacuum power cylinder having pistons connected together, means for connecting said pump cylinder to selected pairs of said motor cylinders, a source of vacuum, and means for placing said vacuum power cylinder in free communication with said source.

15. In a vacuum operated power mechanism for shifting the gears of a transmission, a plurality of hydraulic motor cylinders and pistons, a mechanical interlock for preventing simultaneous movement of certain pairs of said pistons, means for operatively connecting said pistons to said gears, a hydraulic pump cylinder and a vacuum power cylinder having pistons connected together, means for connecting said pump cylinder to selected pairs of said motor cylinders, the volume displaced by the piston of said vacuum power cylinder being substantially greater than the volume displaced by the piston of said pump cylinder during any joint movement thereof, a source of vacuum, and means for placing said vacuum power cylinder in free communication with said source.

16. In a gear shifter, a member movable in an H-shaped path for making different gears ratios effective, double acting hydraulic cylinder means for moving said member longitudinally of said path, a second double acting hydraulic cylinder means for moving said member transversely of said path, four separate conduits leading from each end of one hydraulic cylinder means to each end of the other hydraulic cylinder means and providing pairs of conduits to each end of each hydraulic cylinder means, means for selectively supplying fluid under pressure to any one of said four conduits, and a valve means associated with each cylinder end and forming a connection between said cylinder end and the ends of the conduits associated therewith, said valve means being constructed and arranged to permit free communication between either one of said conduit ends and said cylinder end and to block the other of said conduit ends in response to pressure in said one conduit.

EDWARD F. KROME.